United States Patent
Mooring et al.

(10) Patent No.: US 8,782,365 B1
(45) Date of Patent: Jul. 15, 2014

(54) SYSTEMS AND METHODS OF PROCESSING DATA ASSOCIATED WITH RAPID SNAPSHOT AND RESTORE OF GUEST OPERATING SYSTEM STATES

(71) Applicants: Edward T. Mooring, Santa Clara, CA (US); Yuri Bakalov, Paris (FR)

(72) Inventors: Edward T. Mooring, Santa Clara, CA (US); Yuri Bakalov, Paris (FR)

(73) Assignee: Lynx Software Technologies, Inc., San Jose, CA (US)

(*) Notice: Subject to any disclaimer, the term of this patent is extended or adjusted under 35 U.S.C. 154(b) by 108 days.

(21) Appl. No.: 13/626,631

(22) Filed: Sep. 25, 2012

Related U.S. Application Data (63) Continuation of application No. PCT/US2011/036553, filed on May 13, 2011.

(60) Provisional application No. 61/321,885, filed on Apr. 8, 2010.

(51) Int. Cl.
*G06F 9/455* (2006.01)
*G06F 9/46* (2006.01)
*G06F 3/06* (2006.01)
*G06F 11/14* (2006.01)

(52) U.S. Cl.
CPC ........... *G06F 3/065* (2013.01); *G06F 9/455* (2013.01); *G06F 2201/84* (2013.01); *G06F 9/45545* (2013.01); *G06F 11/1456* (2013.01)
USPC .............................................. 711/162; 718/1

(58) Field of Classification Search
None
See application file for complete search history.

(56) References Cited

U.S. PATENT DOCUMENTS

| | | | |
|---|---|---|---|
| 8,458,697 B2 * | 6/2013 | Amano et al. | 718/1 |
| 2005/0223238 A1 | 10/2005 | Schmid et al. | |
| 2008/0127336 A1 | 5/2008 | Sun et al. | |
| 2008/0263659 A1 | 10/2008 | Alme | |
| 2009/0099988 A1 | 4/2009 | Stokes et al. | |
| 2009/0288167 A1 | 11/2009 | Freericks et al. | |
| 2010/0077481 A1 | 3/2010 | Polyakov et al. | |
| 2012/0066680 A1 * | 3/2012 | Amano et al. | 718/1 |

OTHER PUBLICATIONS

International Search Report for PCT/US2011/036553 dated Dec. 26, 2011, 4 pgs.

* cited by examiner

*Primary Examiner* — Kevin Verbrugge
(74) *Attorney, Agent, or Firm* — DLA Piper LLP (US)

(57) ABSTRACT

The present disclosure relates to saving and restoring operating system states and, more particularly, towards systems and methods of processing information associated with obtaining snapshots of and restoring guest operating system states rapidly.

15 Claims, 7 Drawing Sheets

Fig 2: Kernel Separation Layer (Hypervisor)

SYSTEMS AND METHODS OF PROCESSING DATA ASSOCIATED WITH RAPID SNAPSHOT AND RESTORE OF GUEST OPERATING SYSTEM STATES

BACKGROUND

1. Field

The present disclosure relates to saving and restoring operating system states and, more particularly, towards systems and methods of processing information associated with obtaining snapshots of and restoring guest operating system states rapidly.

2. Description of Related Information

Existing implementations involving guest operating systems are requiring greater and greater capability of computing platforms to rapidly save snapshots or checkpoints of the guest operating systems and rapidly restore (or "refresh" as also used herein) the guest operating systems to these states. Traditional methods of processing guest operating system states can not meet the speed requirements now desired to save and restore/refresh these states. As such, there are needs for systems and methods that can provide solutions at sufficient speed.

BRIEF DESCRIPTION OF THE FIGURES

Reference is made to the attached drawings, wherein elements having the same reference designations represent like elements throughout and wherein.

DETAILED DESCRIPTION OF ILLUSTRATIVE IMPLEMENTATIONS

Aspects of the present disclosure relate to systems and methods of processing information associated with obtaining snapshots of and restoring guest operating system states rapidly. Guest operating systems in regard to which the present rapid snapshot (or checkpoint) and rapid restore (or refresh) innovations apply may involve a platform including one or more guest operating system (OS) windows or instances, a kernel separation layer, and a hardware platform 140, such as a platform comprised of one or more multiple-CPU core system(s). In some illustrative implementations, for example, the platform may contain a 64-bit hardened secure Linux OS virtual machine. This virtual machine may manage information, such as snapshot data, provide device virtualization services, and manage other components implemented as virtual machines running different operating systems (OS). Further, multiple guest operating systems may be configured to run simultaneously, with the virtual machine being configured to control and/or monitor each guest OS's status.

In order to deal with large quantities/volumes of information, parallel guest operating systems may be implemented and supported on a single platform, and each OS shall be absolutely isolated. To achieve such isolation in accordance with aspects of the present inventions, kernel separation innovations are implemented at root layer to ensure the platform is secure and safe and not penetrable by executable code thereon. Further, the channel between the platform and the guest operating system instances may be managed by the kernel separation components/platform, enabling high speed, secure and safe interaction and operation. Again, each instance and its OS may be totally isolated from each other. The kernel separation layer ensures that the multiple operating systems, which may be Windows and/or other operation systems, are isolated and that each OS operates a native application environment, without the need for emulation. Once processing of desired results is completed, each instance's OS can be refreshed in seconds to ensure subsequent processing is conducted in a completely original clean OS native environment.

Figure 1:
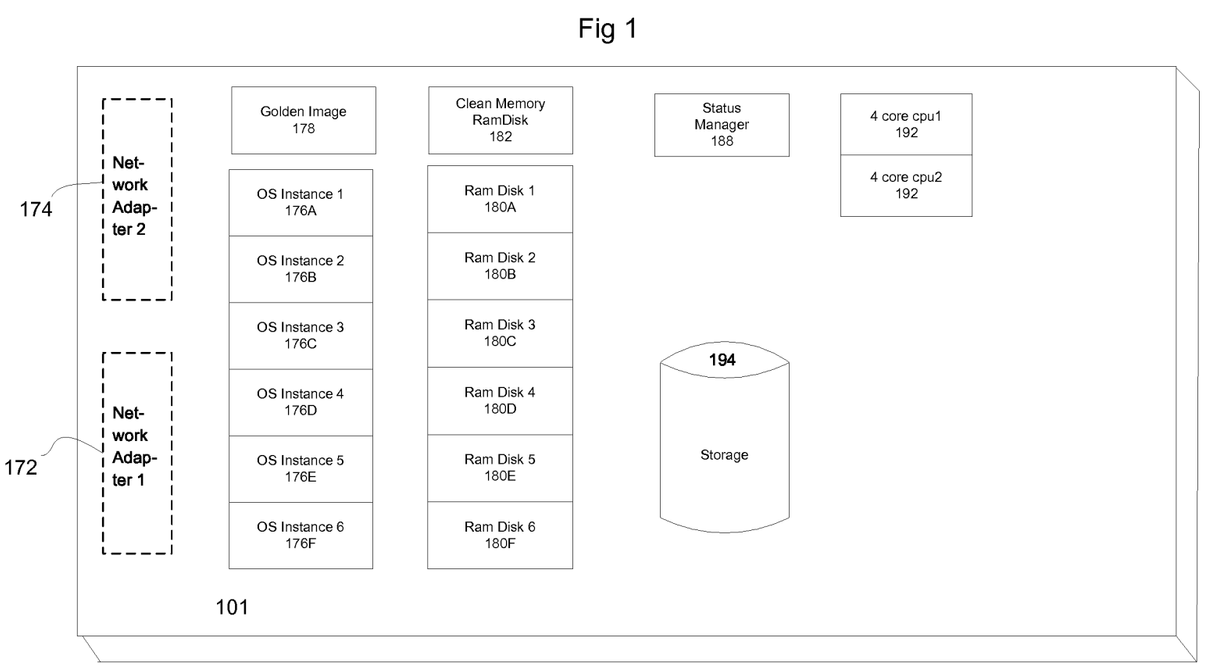
FIG. 1 illustrates an exemplary block diagram showing various illustrative systems, platforms, and/or components, according to certain implementations.

FIG. 1 is a block diagram showing an illustrative platform or appliance, according to certain implementations. Referring to the exemplary configuration or platform 101 of FIG. 1, a golden image 178 may be provided of the state information any of the guest OS instances 176A-176F prior to effecting a desired processing or result, after which restoration of the state information may be needed. Snapshots of the guest OS instance state may then be taken via interaction of a guest virtual disk device and a virtual device server, as set forth in more detail below. In some implementations, an exemplary platform may be configured with 1 or more network adapters, a first adapter 172 that is required for network communication and additional adapters 174 to provide network redundancy or increased communication capability. As shown, there are 6 guest operating system components or instances 176A-176F running in parallel, although more may be implemented if sufficient processing power is available. In operation, information in each guest OS instance may be managed by a management component (not shown) and stored in memory 194. Further, the management component may be configured to run on a totally separate OS that is different from a guest OS, for example in one instance, a 64-bit Linux hardened secure and safe OS. Such implementation is fast and safe, and also independent from the running OS.

Once subsequent results or processing occur, the guest OS instance is restored/refreshed via a clean memory snapshot 178 (or "golden image"). The various RAM disks 180A-180F that are associated with each instance may also get refreshed via such clean memory RAM disk at 182. Once each finished instance memory and its RAM disk get refreshed, they are again clean and ready for subsequent processing. A status manager 188 may also be included to maintain and update status of the guest OS instances. In addition to one or more banks of the core CPU elements 192, 193, various hard disks may also be utilized, with one representative storage element 194 being shown.

Figure 2:
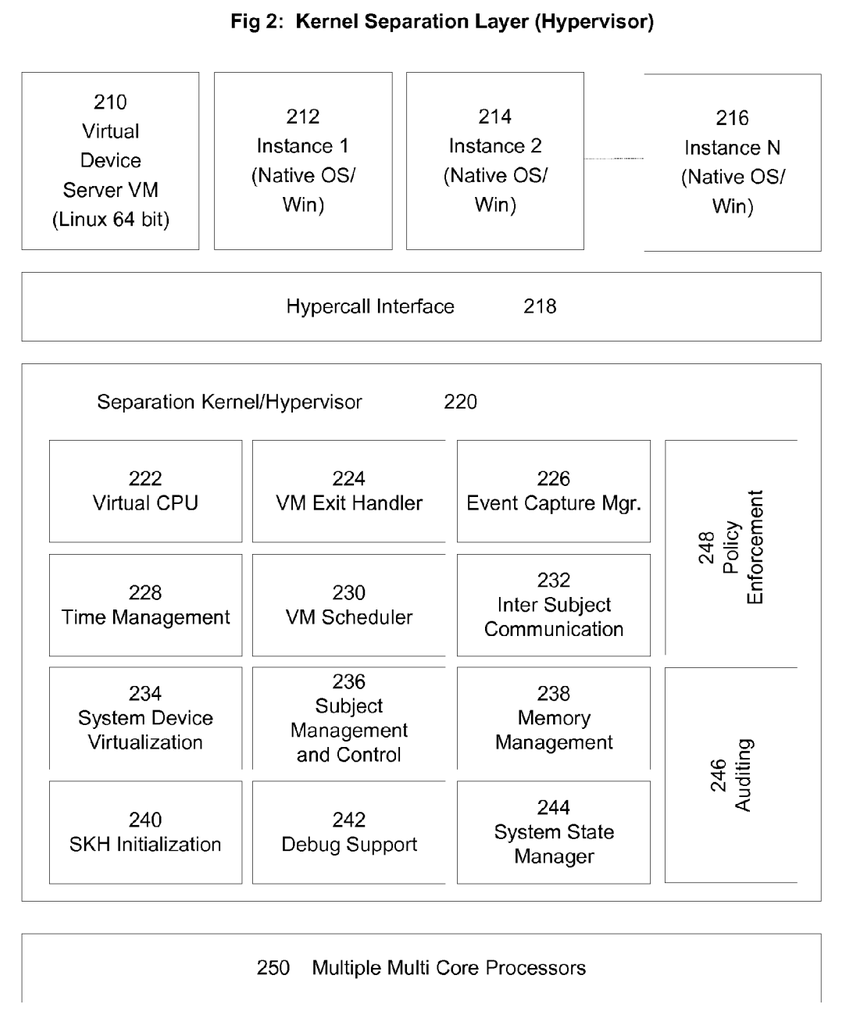
FIG. 2 is a diagram illustrating various exemplary aspects of kernel separation layer components and/or features, according to certain implementations.

FIG. 2 is a diagram illustrating various exemplary aspects of the kernel separation layer as well as components and/or features thereof, according to certain implementations. Referring to FIG. 2, a platform 210 such as a virtual device server, several guest OS instances 212, 214, 216, an interface 218, a separation kernel platform 220, and a core processing area 250 are shown. Here, the core processing area 250 may comprise the physical hardware of the system, including multiple multi-core processors, for example. As indicated above, implementation of a kernel separation layer ensures that multiple operations systems, such as Windows OS (or other operating systems), are isolated from each other and that each OS has its native application environment without the need for emulation. Further, such OS is configured to refresh itself in a very short timeframe, to enable analysis of large volumes of information.

As shown by way of illustration and not limitation in FIG. 2, exemplary kernel separation layer 220 (also referred to as "hypervisor") provides for a secure and safe platform that may host multiple guest OS instances running in parallel. Further, as a function of the kernel separation layer and isolation it provides, systems and methods herein may be implemented as appliances and configured for in-line or for off-line processing, capable of receiving and processing large quantities of information. A platform 210 such as a virtual device server, as illustrated in FIG. 2, may be configured to manage and provide device virtualization and snapshot save and restore services to multiple guest OS instances 212-216. Here, for example, an illustrative virtual device 210 may be built with security hardened 64 bit Linux OS, i.e., to provide management and services to multiple virtual machines running instances of various guest operating systems such as Windows or Linux. FIG. 2 also depicts several guest OS instances 212, 214, 216, which illustrate multiple instances running in parallel on the secure and safe platform.

FIG. 2 also includes an interface 218 configured to make calls to/from the various isolated subcomponents of the separation kernel 220. As shown, separation kernel 220 illustrates an exemplary design graph overview of an entire separation kernel layer (or "hypervisor"). Separation kernel 220 may be configured with numerous subcomponents such as a virtual CPU subcomponent that provides virtual access to a virtualized CPU core to subject information running on the instances 212, 214, 216, enabling operation of a plurality of virtual machines. Separation kernel may also be configured with a virtual machine exit handling subcomponent to manage exit calls for virtual machine exit events. An event capture management subcomponent 226 may also be included to handle all exceptional events, including hardware interrupts and virtual machine events. The kernel may also include: a time management module 228 that manages timing features, such as a real clock source, for presentation to all of the subject systems/machines; a virtual machine scheduler 230 that schedules each subject (virtual machine) as to when to run, how long it runs, and when to yield (hold); an inter-subject (virtual machine) communication module 232 that provides communication management between subjects.

For example, by means of the inter-subject communication module 232, the virtual device server 210 may send, e.g., via the hypercall interface 218, a synthetic interrupt to a guest OS instance 212-216. This causes the virtual machine running the guest OS to inject a physical interrupt into the guest. In some implementations, the guest OS instance may send a synthetic interrupt to the virtual device server. This mechanism may be used to notify the virtual device server of a request for service, or to notify the guest OS instance that its request for service has been completed.

In some implementations, the kernel may also include: a system device virtualization subcomponent 234 that presents virtual PCI devices to subjects and manages which subjects own which devices; a subject management control subcomponent 236 that manages all subjects as when to start, run, stop, suspend, etc.; and a memory management subcomponent 238 that provides allocation of the entire physical memory distribution and management features, including input/output aspects of a memory management unit. A separation kernel initialization subcomponent 240 may also be included for initializing the overall separation kernel. According to further implementations, the kernel may also comprise a debug support module 242 to perform debugging functions and/or an overall system state manager 244 to monitor overall system status as well as different stages of operation cycle. Moreover, an auditing subcomponent 246 may also be included to, automatically or on demand, check overall system and subject integrity, provide alerts, and produce alert messaging and logs (here, for example, the auditing subcomponent may provide actionable alert regarding shut down or suspension of subject instances, executables, and/or the hypervisor). Finally, a policy enforcement subcomponent 248 may be included within the kernel to provide one or more sets of rules and act on those rules to ensure that the overall system integrity is within acceptable operating parameters.

Figure 3:
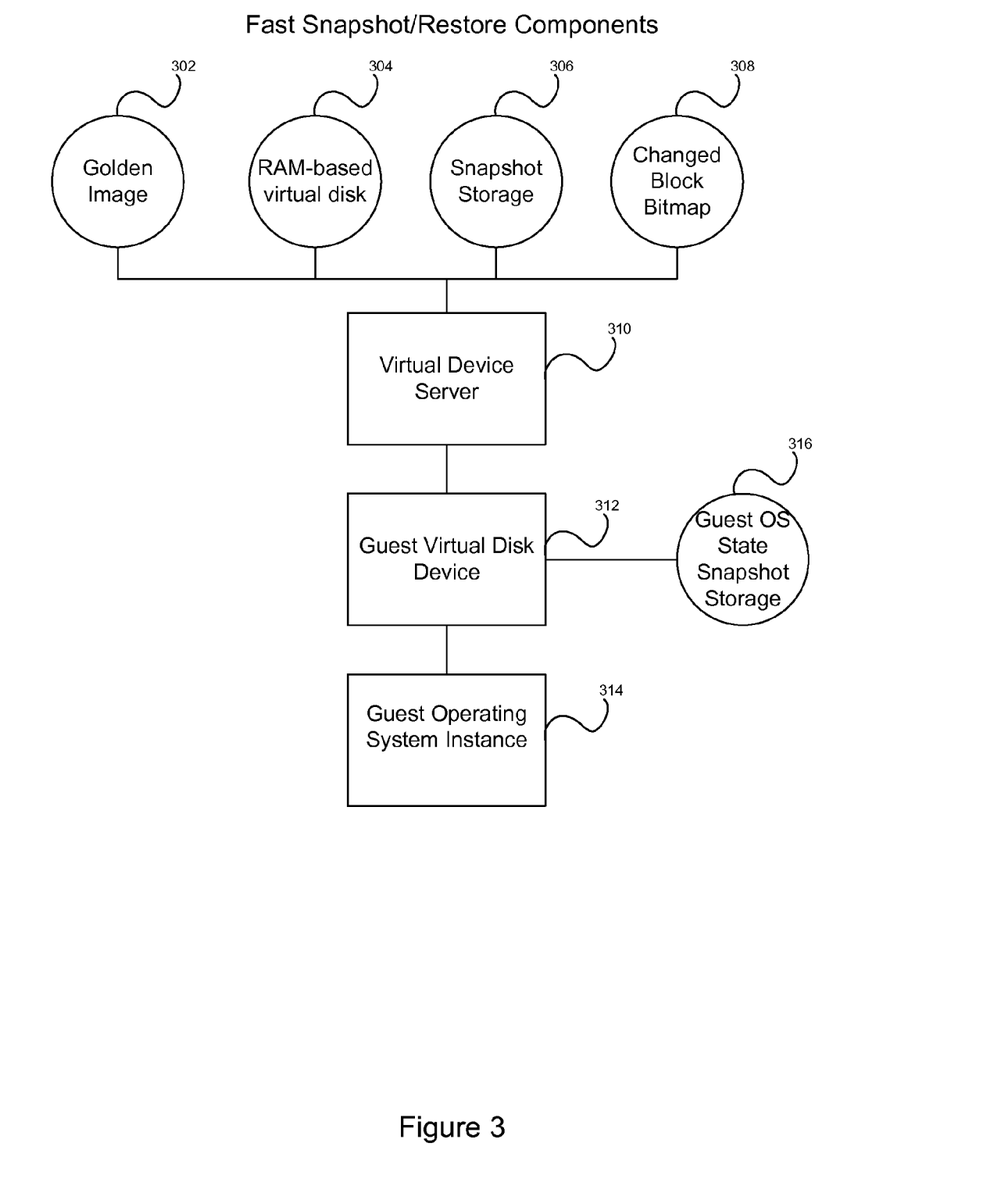
FIG. 3 is a diagram illustrating various exemplary fast snapshot/restore components, according to certain implementations.

FIG. 3 is a diagram illustrating various exemplary fast snapshot/restore components, according to certain implementations. Referring to FIG. 3, components of an illustrative platform for implementing the rapid snapshot and restore features herein are disclosed. Here, a virtual device server 310 is shown which may manage and provide services to one or more guest operating system (guest OS) instances 314 as well as one or more associated guest virtual disk devices 312. Further, each guest virtual disk device 312 may have a guest OS state snapshot storage device/media/pointer associated with it. Finally, the virtual device server 310 may be coupled to various data stores containing information to enable the virtual device server to perform the processing herein. For example, the virtual device server 310 may be coupled to a golden image store 302, a RAM-based virtual disk 304, a snapshot storage component 306 and a changed block bitmap 308. The golden image store 302 may contain a known-good virtual disk image for a specific type and configuration of guest operating system instance. There may be one or more instances of the RAM-based virtual disk 304 associated with a specific guest OS instance which may be initialized with a copy of the golden image for use by a specific guest OS instance, and may be changed by the operation of that instance. Each RAM-based virtual disk may be associated with a changed block bitmap 308 which may be used to mark which blocks of memory within the RAM-based virtual disk have been changed during the operation of the guest OS instance. There may also be a snapshot storage component 306 associated with each RAM-based virtual disk. This component may be used to store the contents of the memory blocks within the RAM-based virtual disk have changed from the golden image during the operation of the guest operating system instance, as identified by the changed block bitmap.

Figure 4:
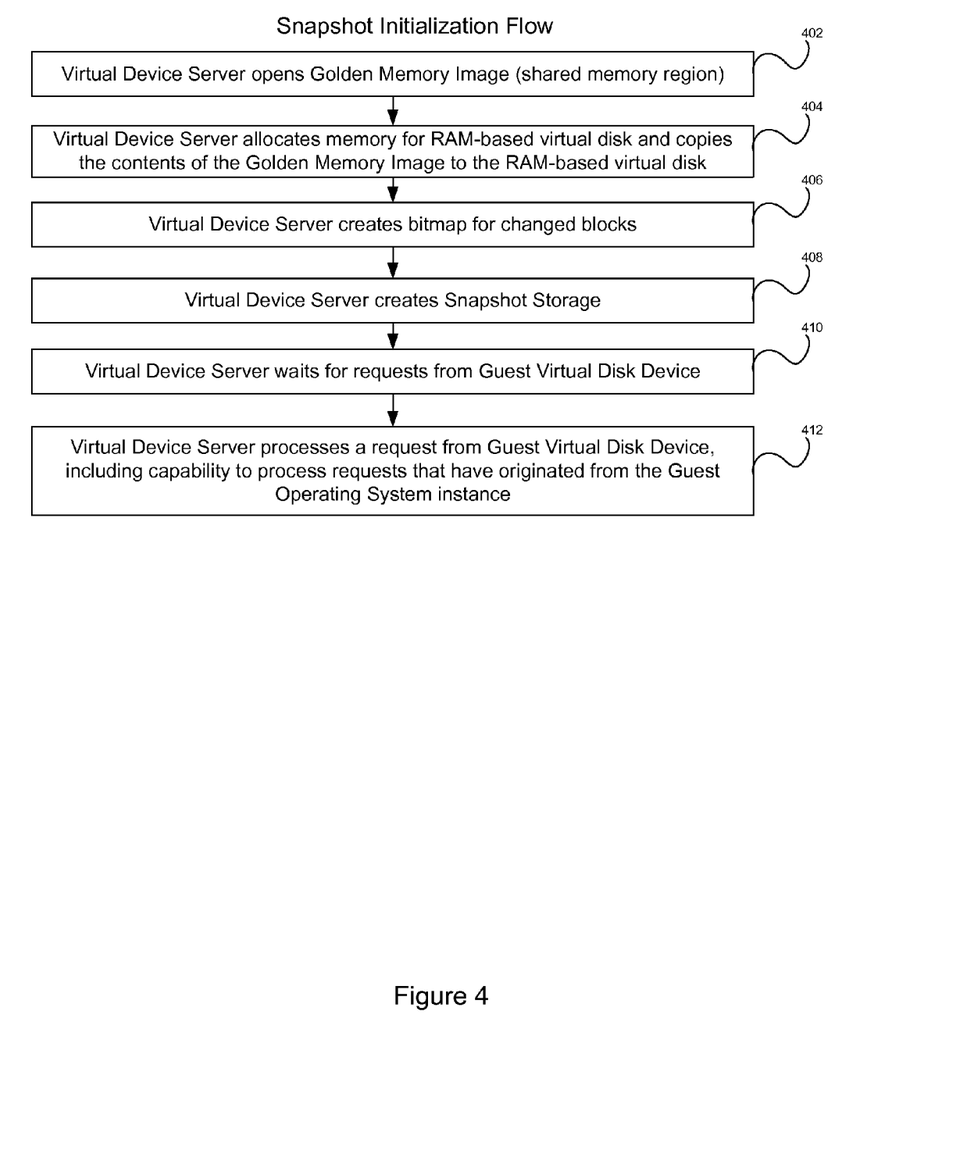
FIG. 4 is a flow diagram illustrating various exemplary snapshot initialization process features, according to certain implementations.

FIG. 4 is a flow diagram illustrating various exemplary snapshot initialization process features, according to certain implementations. Referring to FIG. 4, an illustrative method of initializing a virtual device server such as the one above for performing the snapshot processing herein is disclosed. According to these implementations, a method may comprise the following steps performed via the virtual device server: opening the Golden Memory image (e.g., from a shared memory region) 402, allocating memory for RAM-based virtual disk 404, e.g., for storage of the guest OS disk image, copying the contents of the Golden Image to the RAM-based virtual disk, creating bitmaps for any changed blocks 406, creating/effecting the snapshot storage 408, waiting for requests from the guest virtual disk device 410, and processing request information from the guest virtual disk device including capability to process requests that have originated from the guest operating system instance(s) 412.

Figure 5:
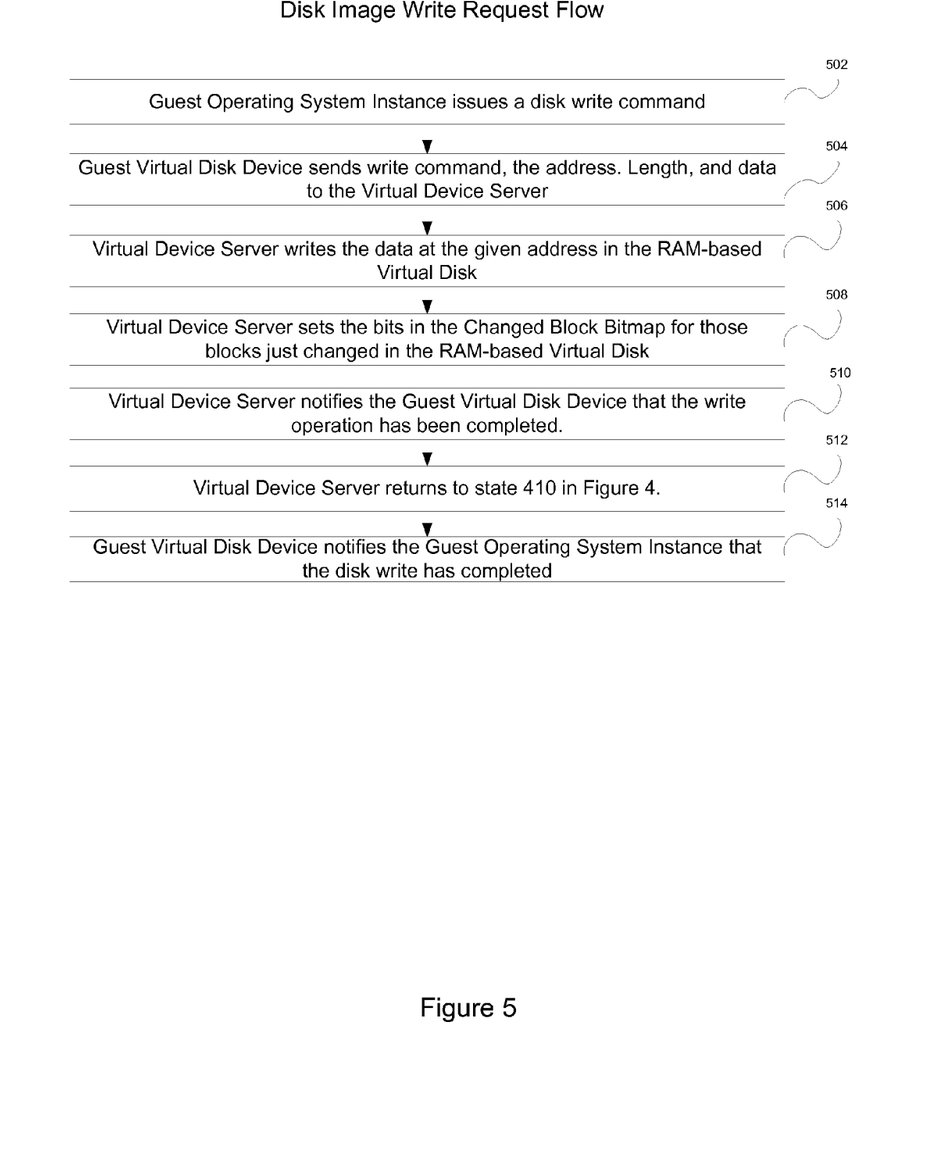
FIG. 5 is a flow diagram illustrating various exemplary disk image write request process features, according to certain implementations.

FIG. 5 is a flow diagram illustrating various exemplary disk image write request process features, according to certain implementations. Referring to FIG. 5, one illustrative method for processing disk image write request information associated with performing rapid snapshot and restore of guest operating system instance state may comprise: issuing, via a guest operating system Instance, a disk write command 502; sending, from the guest virtual desk device to the virtual device server, write information 504; writing, via the virtual device server, data in the write information at a given address in a RAM-based virtual disk 506; setting, via the virtual device server, bits in a Changed Block Bitmap for blocks changed in the RAM-based Virtual Disk 508; notifying, via the virtual device server, the guest virtual disk device that the write operation has been completed 510; returning the virtual device server to a wait state where a request from the guest virtual disk device is awaited 512; and notifying, via the guest virtual disk device, the guest operating system instance that the disk write has completed 514.

Figure 6:
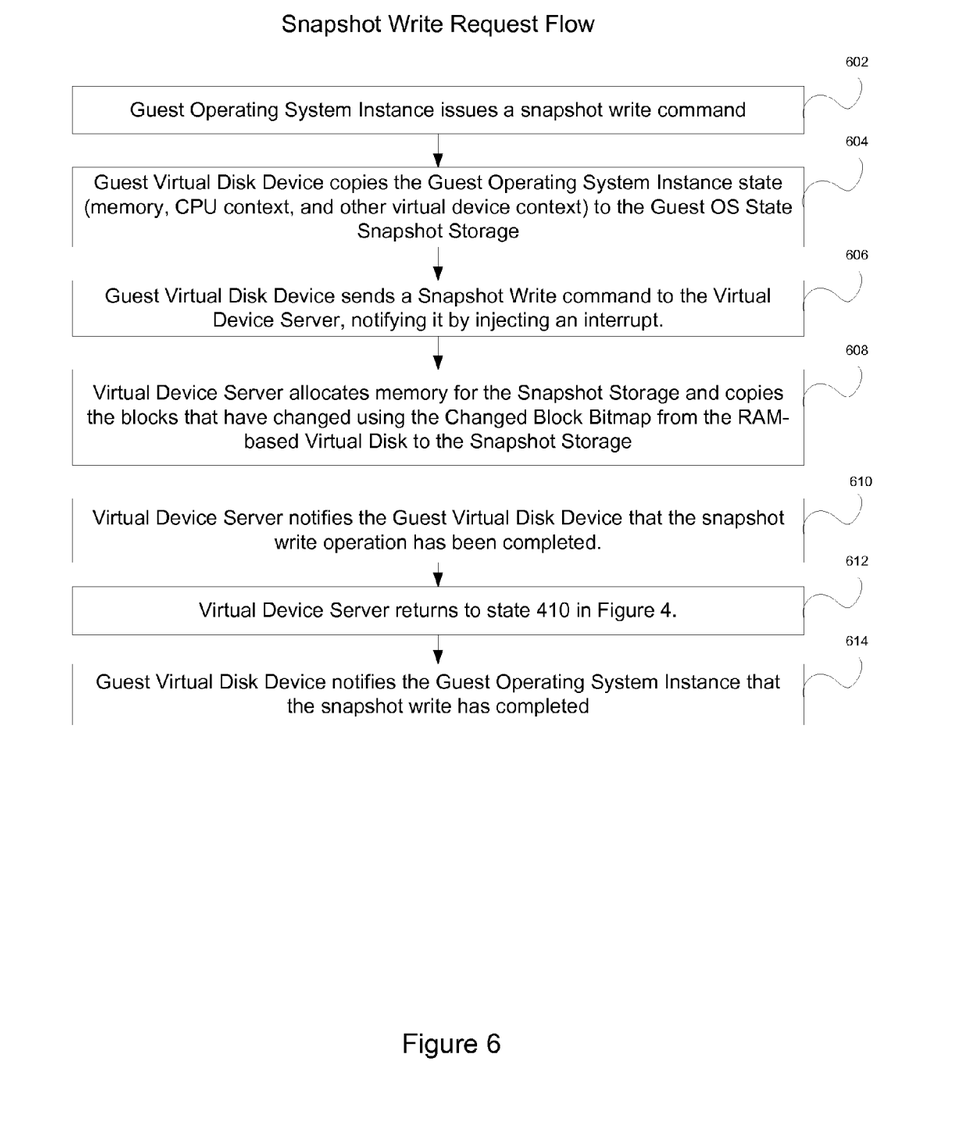
FIG. 6 is a flow diagram illustrating various exemplary snapshot write request process features, according to certain implementations.

FIG. 6 is a flow diagram illustrating various exemplary snapshot write request process features, according to certain implementations. Referring to FIG. 6, an illustrative method for processing snapshot write request instructions/information associated with performing rapid snapshot and restore of guest operating system instance state may comprise: issuing, via a guest operating system instance, a snapshot write command 602; copying, via a guest virtual disk device, the guest operating system instance state to a guest OS state snapshot storage 604; sending, via the guest virtual disk device, a snapshot write command to the virtual device server, notifying it by injecting an interrupt 606; allocating, via the virtual device server, memory for the snapshot storage and copying blocks of data that have changed using the changed block bitmap from the RAM-based virtual disk to the snapshot storage 608; notifying, via the virtual device server, the guest virtual disk device that the snapshot write operation has been completed 610; returning the virtual device server to a wait state where a request from the guest virtual disk device is awaited 612; and notifying, via the guest virtual disk device, the guest operating system instance that the snapshot write has completed 614.

Figure 7:
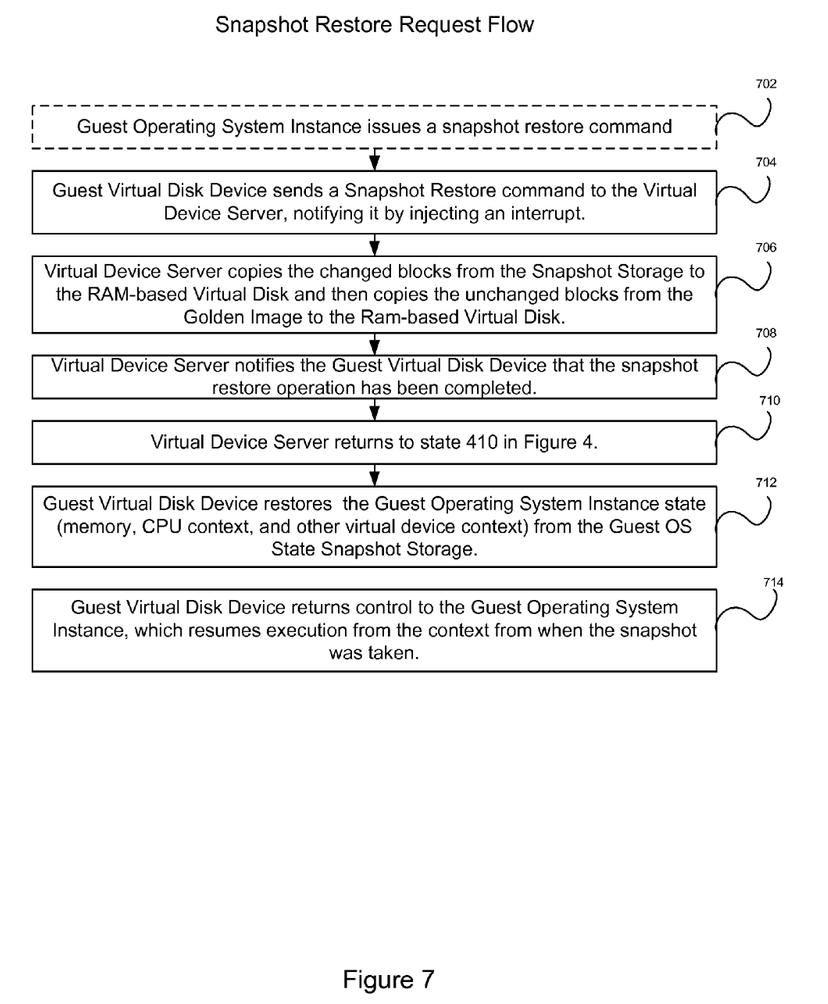
FIG. 7 is a flow diagram illustrating various exemplary snapshot restore request process features, according to certain implementations.

FIG. 7 is a flow diagram illustrating various exemplary snapshot restore request process features, according to certain implementations. Referring to FIG. 7, an illustrative method for processing snapshot restore request instructions/information associated with performing rapid snapshot and restore of guest operating system instance state may comprise: issuing, via a guest operating system instance, a snapshot restore command 702; sending, via the guest virtual disk device, a snapshot restore command to the virtual device server, including notifying it by injecting an interrupt 704; copying, via the virtual device server, the changed blocks from the snapshot storage to the RAM-based virtual disk and then copying the unchanged blocks from a golden image to the RAM-based virtual disk 706; notifying, via the virtual device server, the guest virtual disk device that the snapshot restore operation has been completed 708; returning the virtual device server to a wait state where a request from the guest virtual disk device is awaited 710; restoring, via the guest virtual disk device, the guest operating system instance state from the guest OS state snapshot storage 712; and returning, via the guest virtual disk device, control to the guest operating system instance, which resumes execution from the context from when the snapshot was taken 714.

As set forth above, the innovations herein may be implemented via one or more software components/modules, appliances, servers, other components, or distributed between such elements. When implemented as an appliance, such an appliance may comprise either components such as a general-purpose CPU, RAM, etc. found in general-purpose computers, or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, circuitry, computing/processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: various software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of software, logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The invention claimed is:

1. A method for performing rapid snapshot and restore of guest operating system instance state, the method comprising:
   processing a Golden Image of a guest OS instance for storage in RAM-based memory, including using a bitmap to keep track of incremental changes between the Golden Image and the snapshot in the RAM-based storage associated with a specific guest OS instance; and
   after subsequent processing/results are effected, restoring the guest OS instance to the changed state associated with the snapshot stored in RAM.

2. The method of claim 1 wherein information is processed within one of multiple operating systems that are in isolation from core hardware via a kernel separation layer, wherein each operating system has a native application environment without necessity of emulation.

3. The method of claim 1 further comprising:
   opening a Golden Memory image;
   allocating memory for RAM-based virtual disk for storage of the guest OS snapshots;

copying the contents of the Golden Memory image into the RAM-based virtual disk;
creating bitmaps for any blocks of data changed as between the snapshot and the Golden Image;
storing data of the snapshot into RAM storage;
waiting for requests from the guest virtual disk device; and
performing processing of request information from the guest virtual disk device, wherein the processing includes a capability to process requests that have originated from the guest operating system instance(s).

4. The method of claim 1 further comprising:
issuing, via a guest operating system Instance, a disk write command;
sending, from the guest virtual disk device to the virtual device server, write information;
writing, via the virtual device server, data in the write information at a given address in a RAM-based virtual disk;
setting, via the virtual device server, bits in a Changed Block Bitmap for blocks changed in the RAM-based Virtual Disk;
notifying, via the virtual device server, the guest virtual disk device that the write operation has been completed;
returning the virtual device server to a wait state where a request from the guest virtual disk device is awaited;
notifying, via the guest virtual disk device, the guest operating system instance that the disk write has completed.

5. The method of claim 1 further comprising:
issuing, via a guest operating system instance, a snapshot write command;
copying, via a guest virtual disk device, the guest operating system instance state to a guest OS state snapshot storage;
sending, via the guest virtual disk device, a snapshot write command to the virtual device server, notifying it by injecting an interrupt;
allocating, via the virtual device server, memory for the snapshot storage and copying blocks of data that have changed using the changed block bitmap from the RAM-based virtual disk to the snapshot storage;
notifying, via the virtual device server, the guest virtual disk device that the snapshot write operation has been completed;
returning the virtual device server to a wait state where a request from the guest virtual disk device is awaited; and
notifying, via the guest virtual disk device, the guest operating system instance that the snapshot write has completed.

6. The method of claim 1 further comprising:
issuing, via a guest operating system instance, a snapshot restore command;
sending, via the guest virtual disk device, a snapshot restore command to the virtual device server, including notifying it by injecting an interrupt;
copying, via the virtual device server, the changed blocks from the snapshot storage to the RAM-based virtual disk and then copying the unchanged blocks from a golden image to the RAM-based virtual disk;
notifying, via the virtual device server, the guest virtual disk device that the snapshot restore operation has been completed;
returning the virtual device server to a wait state where a request from the guest virtual disk device is awaited;
restoring, via the guest virtual disk device, the guest operating system instance state from the guest OS state snapshot storage; and
returning, via the guest virtual disk device, control to the guest operating system instance, which resumes execution from the context from when the snapshot was taken.

7. A method for initializing a virtual device server associated with performing rapid snapshot and restore of guest operating system instance state, the method comprising:
opening a Golden Memory image;
allocating memory for RAM-based virtual disk for storage of the guest OS snapshots;
copying the contents of the Golden Memory image into the RAM-based virtual disk;
creating bitmaps for any blocks of data changed as between the snapshot and the Golden Image;
storing data of the snapshot into RAM storage;
waiting for requests from the guest virtual disk device; and
performing processing of request information from the guest virtual disk device, wherein the processing includes a capability to process requests that have originated from the guest operating system instance(s).

8. The method of claim 7 wherein all of the steps are performed via the virtual device server.

9. The method of claim 7 wherein information is processed within one of multiple operating systems that are in isolation from core hardware via a kernel separation layer, wherein each operating system has a native application environment without necessity of emulation.

10. The method of claim 7,
wherein the step of performing processing includes:
issuing, via a guest operating system Instance, a disk write command;
sending, from the guest virtual disk device to the virtual device server, write information;
writing, via the virtual device server, data in the write information at a given address in a RAM-based virtual disk;
setting, via the virtual device server, bits in a Changed Block Bitmap for blocks changed in the RAM-based Virtual Disk;
notifying, via the virtual device server, the guest virtual disk device that the write operation has been completed;
and further comprising:
returning the virtual device server to the waiting step/state, where a request from the guest virtual disk device is awaited; and
notifying, via the guest virtual disk device, the guest operating system instance that the disk write has completed.

11. The method of claim 7,
wherein the step of performing processing includes:
issuing, via a guest operating system instance, a snapshot write command;
copying, via a guest virtual disk device, the guest operating system instance state to a guest OS state snapshot storage;
sending, via the guest virtual disk device, a snapshot write command to the virtual device server, notifying it by injecting an interrupt;
allocating, via the virtual device server, memory for the snapshot storage and copying blocks of data that have changed using the changed block bitmap from the RAM-based virtual disk to the snapshot storage;
notifying, via the virtual device server, the guest virtual disk device that the snapshot write operation has been completed;
and further comprising:

returning the virtual device server to the waiting step/state, where a request from the guest virtual disk device is awaited; and notifying, via the guest virtual disk device, the guest operating system instance that the snapshot write has completed.

12. The method of claim 7, wherein the step of performing processing includes:
- issuing, via a guest operating system instance, a snapshot restore command;
- sending, via the guest virtual disk device, a snapshot restore command to the virtual device server, including notifying it by injecting an interrupt;
- copying, via the virtual device server, the changed blocks from the snapshot storage to the RAM-based virtual disk and then copying the unchanged blocks from a golden image to the RAM-based virtual disk;
- notifying, via the virtual device server, the guest virtual disk device that the snapshot restore operation has been completed;

and further comprising:
- returning the virtual device server to the waiting step/state, where a request from the guest virtual disk device is awaited;
- restoring, via the guest virtual disk device, the guest operating system instance state from the guest OS state snapshot storage; and
- returning, via the guest virtual disk device, control to the guest operating system instance, which resumes execution from the context from when the snapshot was taken.

13. A method for processing disk image write request information associated with performing rapid snapshot and restore of guest operating system instance state, the method comprising:
- issuing, via a guest operating system Instance, a disk write command;
- sending, from the guest virtual disk device to the virtual device server, write information;
- writing, via the virtual device server, data in the write information at a given address in a RAM-based virtual disk;
- setting, via the virtual device server, bits in a Changed Block Bitmap for blocks changed in the RAM-based Virtual Disk;
- notifying, via the virtual device server, the guest virtual disk device that the write operation has been completed;
- returning the virtual device server to a wait state where a request from the guest virtual disk device is awaited;
- notifying, via the guest virtual disk device, the guest operating system instance that the disk write has completed.

14. The method of claim 13 wherein the write information includes a write command, an address, a length and/or data.

15. The method of claim 13 wherein information is processed within one of multiple operating systems that are in isolation from core hardware via a kernel separation layer, wherein each operating system has a native application environment without necessity of emulation.

* * * * *